US010552607B2

(12) United States Patent
Matthews

(10) Patent No.: US 10,552,607 B2
(45) Date of Patent: Feb. 4, 2020

(54) MOVING TARGET DEFENSES FOR DATA STORAGE DEVICES

(71) Applicant: NexiTech, Inc., Woodland Park, CO (US)

(72) Inventor: Donald E. Matthews, Woodland Park, CO (US)

(73) Assignee: NexiTech, Inc., Woodland Park, CO (US)

( * ) Notice: Subject to any disclaimer, the term of this patent is extended or adjusted under 35 U.S.C. 154(b) by 239 days.

(21) Appl. No.: 15/668,127

(22) Filed: Aug. 3, 2017

(65) Prior Publication Data
US 2019/0042742 A1 Feb. 7, 2019

(51) Int. Cl.
*G06F 12/14* (2006.01)
*G06F 21/55* (2013.01)
*G06F 21/56* (2013.01)
*H04L 29/06* (2006.01)
*G06F 21/53* (2013.01)
*G06F 21/78* (2013.01)
*H04L 29/08* (2006.01)

(52) U.S. Cl.
CPC ........... *G06F 21/556* (2013.01); *G06F 21/53* (2013.01); *G06F 21/552* (2013.01); *G06F 21/566* (2013.01); *G06F 21/78* (2013.01); *H04L 63/0236* (2013.01); *H04L 63/10* (2013.01); *H04L 63/162* (2013.01); *H04L 63/18* (2013.01); *H04L 67/1097* (2013.01); *H04L 63/0272* (2013.01); *H04L 63/083* (2013.01)

(58) Field of Classification Search
USPC ........................................................ 726/23
See application file for complete search history.

(56) References Cited

U.S. PATENT DOCUMENTS

| | | | | |
|---|---|---|---|---|
| 7,010,660 | B2 * | 3/2006 | Mimatsu | G06F 3/0605 711/112 |
| 8,743,872 | B2 * | 6/2014 | Chidambaram | H04L 47/6205 370/386 |
| 9,232,005 | B1 * | 1/2016 | Shah | G06F 3/067 |
| 9,311,230 | B2 * | 4/2016 | Fitch | G06F 12/109 |
| 9,491,571 | B2 * | 11/2016 | Karp | G05B 15/02 |
| 9,578,063 | B1 | 2/2017 | Iyer et al. | |
| 1,028,455 | A1 | 5/2019 | Owen et al. | |
| 10,326,798 | B2 | 6/2019 | Lambert | |

(Continued)

OTHER PUBLICATIONS

U.S. Appl. No. 16/453,563, filed Jun. 26, 2019, Matthews.
Official Action for U.S. Appl. No. 16/453,563, dated Jul. 25, 2019, 12 pages.

*Primary Examiner* — Amare F Tabor
(74) *Attorney, Agent, or Firm* — Sheridan Ross P.C.

(57) ABSTRACT

Systems and methods for actively securing data storage devices utilize the technique of storage virtualization. In embodiments, would-be cyberattackers are presented with many possible "ports" or "channels" by which to communicate over a network with a data storage device. Unknown to the attacker, at any given time, only one of these ports or channels is the "correct," or "active," port; all of the other ports are dummies that do not permit communication with the storage device. The active port is dynamically, randomly, and/or continually reconfigured, seriously impeding the ability of the attacker to access the data storage device through the active port.

11 Claims, 2 Drawing Sheets

(56) References Cited

U.S. PATENT DOCUMENTS

| | | | |
|---|---|---|---|
| 2013/0219077 A1* | 8/2013 | Ben-Amos | H04L 67/1097 |
| | | | 709/232 |
| 2017/0103039 A1* | 4/2017 | Shamis | G06F 15/17331 |
| 2017/0153988 A1 | 6/2017 | Panesar et al. | |
| 2018/0137272 A1 | 5/2018 | Kamal | |
| 2018/0349631 A1 | 12/2018 | Illendula et al. | |

\* cited by examiner

MOVING TARGET DEFENSES FOR DATA STORAGE DEVICES

FIELD OF THE INVENTION

This disclosure relates generally to methods and systems for defending data storage devices against cyberattacks, and specifically to "moving target" defenses that employ techniques including but not limited to storage virtualization.

BACKGROUND OF THE INVENTION

At present, data storage devices are typically protected against deliberate attempts by unauthorized users to copy, transmit, view, steal, or use sensitive, protected, or confidential information stored on the devices (hereinafter "cyberattacks"), if they are protected at all, by passive techniques, such as encryption and authentication. Most commonly, these passive techniques consist largely of encryption of the data on the storage media ("data at rest" encryption), password-based authentication of a storage management interface, and signed firmware on the storage device itself. These passive security techniques are growing increasingly dated as cyberattackers become more resourceful and sophisticated, and many custodians of sensitive information are vulnerable to cyberattacks by failing to provide more robust security solutions for their data storage devices.

One potential solution to the drawbacks of relying on passive techniques is the use of link encryption to protect "data in transit," i.e. data as it flows over networks between the data storage media and one or more users. In link encryption, data are encrypted and decrypted at each end of a communications line within the network, rather than being encrypted at the point of origin and decrypted at the destination as in end-to-end encryption. Link encryption may be difficult to implement, however, especially on storage networks where interoperability between different components of the network is an issue.

Another vulnerability that is unaddressed by passive techniques is the storage management interface itself. The goal of some forms of cyberattack is simply to turn off the power to a data storage device or otherwise make the device inaccessible to authorized users; applied to a large enough number of devices in a short period of time, these types of attack can be devastating to the integrity of a network. Thus, any comprehensive data security solution should protect against attacks originating through the management interface as well.

There is thus a need in the art for more active security techniques for data storage devices. It is particularly advantageous for such techniques to protect data in transit, and to protect the devices from attacks that do not rely on access to unencrypted data stored on the devices.

SUMMARY OF THE INVENTION

It is one aspect of the present invention to provide a moving target defense method for securing at least one data storage device, comprising changing, within a storage appliance, a device type of the at least one data storage device from "disk" to "unknown;" obfuscating a command set for the at least one data storage device inside the storage appliance; after a command is sent to the at least one data storage device from a host computer via the storage appliance, re-obfuscating the command set and reconfiguring a communications channel between the storage appliance and the at least one data storage device; and statically linking an interface library on the host computer to an authorized application on the host computer, wherein the storage appliance allows the authorized application to access the at least one data storage device and blocks any other applications on the host computer from accessing the at least one data storage device.

In embodiments, the reconfiguration of the communications channel may comprise randomly changing a logical unit number (LUN) assigned to the at least one data storage device by a storage communications protocol, wherein the storage communications protocol is at least one of a direct-attached storage (DAS) protocol and a storage area network (SAN) protocol. The storage communications protocol may be a DAS protocol, wherein the DAS protocol is selected from the group consisting of a small computer system interface (SCSI) protocol, a Non-Volatile Memory Express (NVMe) protocol, and an internet SCSI (iSCSI) protocol. The storage communications protocol may be a SAN protocol, wherein the SAN protocol is selected from the group consisting of a Fibre Channel protocol, an internet SCSI (iSCSI) protocol, and an NVMe over Fabrics (NVMe-oF) protocol.

In embodiments, the storage communications protocol may be selected from the group consisting of ATA, SATA, eSATA, NVMe, NVMe-oF, SCSI, SAS, USB, USB 3.0, IEEE 1394, Fibre Channel, ATA over Ethernet (AoE), iSCSI, and HyperSCSI.

In embodiments, the method may further comprise detecting and logging at least one attempt to gain access to the at least one data storage device via an incorrect command set or communications channel. After the at least one attempt, the storage appliance may allow further commands to be sent to the at least one data storage device from the host computer via the storage appliance. After the at least one attempt, the storage appliance may prevent further commands from being sent to the at least one data storage device from the host computer via the storage appliance.

In embodiments, the method may further comprise implementing at least one additional data storage security technique. The at least one additional data storage security protocol may be selected from the group consisting of Challenge-Handshake Authentication Protocol (CHAP) and Internet Protocol security (IPsec).

It is another aspect of the present invention to provide a moving target defense system for at least one data storage device, comprising the at least one data storage device; a host computer, comprising a storage communications protocol initiator, an advanced storage programming interface (ASPI), a moving target defense framework (MTDF), and an authorized application, wherein the ASPI enables the MTDF and the authorized application to send read and/or write commands to the at least one data storage device, wherein the MTDF comprises an MTDF library that is utilized by the authorized application; and a storage appliance, comprising a storage communications protocol target, a device plug-in module, and MTDF extensions, wherein the device plug-in module emulates the at least one data storage device and provides the emulation to the storage communications protocol initiator, wherein the MTDF extensions mirror the MTDF library, wherein, during a session initiated by a user of the host computer and based on at least one algorithm embodied in the MTDF library, the storage communications protocol target presents a plurality of logical unit numbers (LUNs) to the storage communications protocol initiator, wherein the plurality of LUNs comprises an active LUN assigned to the at least one storage device by a storage communications protocol and at least one dummy LUN, wherein the active LUN is known to the ASPI, the MTDF, and the authorized application, wherein, after the user-initiated session terminates and based on the at least one algorithm, at least one of the device plug-in module and MTDF extensions randomly changes the LUN assigned to the at least one data storage device by the storage communications protocol target.

In embodiments, the storage communications protocol may be selected from the group consisting of ATA, SATA, eSATA, NVMe, NVMe-oF, SCSI, iSCSI, SAS, USB, USB 3.0, IEEE 1394, Fibre Channel, ATA over Ethernet (AoE), and HyperSCSI.

In embodiments, the at least one data storage device may be interconnected to the storage appliance in a direct-attached storage (DAS) arrangement. The storage communications protocol may be an SCSI protocol.

In embodiments, the at least one data storage device may be interconnected to the storage appliance in a storage area network (SAN) arrangement. The storage communications protocol may be selected from the group consisting of a Fibre Channel protocol and an iSCSI protocol.

In embodiments, at least one of the device plug-in module and the MTDF extensions may be configured to detect and log at least one attempt to access the at least one data storage device via a dummy LUN. After the at least one attempt, the device plug-in module and the MTDF extensions may allow further commands to be sent to the at least one data storage device from the host computer via the storage appliance. After the at least one attempt, the device plug-in module and the MTDF extensions may prevent further commands from being sent to the at least one data storage device from the host computer via the storage appliance.

In embodiments, the system may implement at least one additional data storage security technique. The at least one additional data storage security technique may be selected from the group consisting of CHAP and IPsec.

DETAILED DESCRIPTION OF THE INVENTION

The present invention provides systems and methods for actively securing data storage devices through the use of storage virtualization. Storage virtualization is a technique by which would-be cyberattackers are presented with many possible "ports" or "channels" by which to communicate over a network with a data storage device. Unknown to the attacker, at any given time, only one of these ports or channels is the "correct," or "active," port; all of the other ports are dummies that do not permit communication with the storage device. The active port is dynamically, randomly, and/or continually reconfigured, seriously impeding the ability of the attacker to access the data storage device through the active port. Storage virtualization can thus be considered a port "hopping" technique, which in some ways may be analogous to dynamic IP address hopping in software-defined networks or frequency hopping in radio communications.

Figure 1:
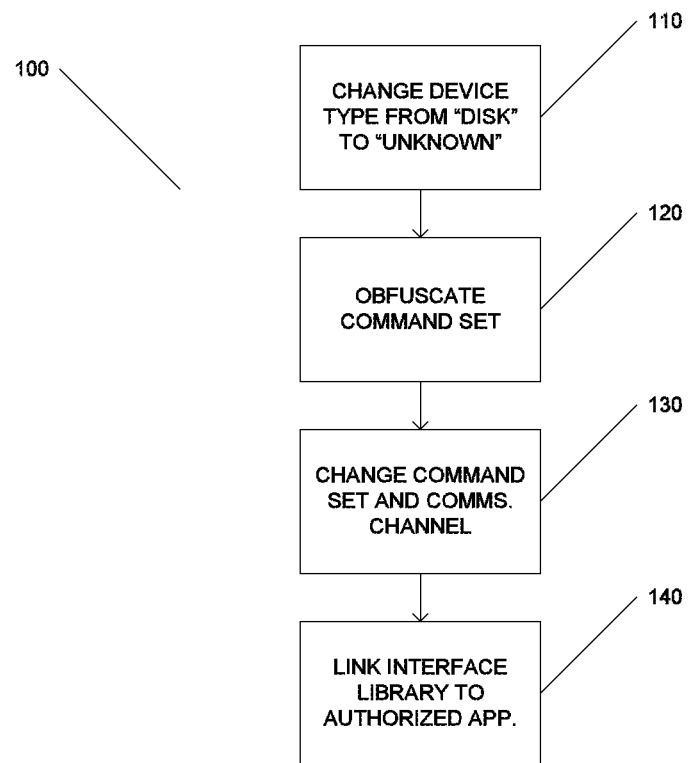
FIG. 1 is a flowchart illustrating a moving target defense method for data storage devices, according to embodiments of the present invention.

Referring now to FIG. 1, in general, the process 100 of storage virtualization of at least one data storage device comprises four steps:

In step 110, a host computer is provided with a storage appliance that blocks the operating system and other software applications on the host computer from accessing the data storage device. Within the storage appliance, a device type of the data storage device is changed from "disk" to "unknown" to isolate the data storage device from the host computer.

In step 120, a command set for the data storage device inside the storage appliance is obfuscated or encoded. This obfuscation or encoding may be accomplished by any known method of obfuscating code.

In step 130, after each command sent to the data storage device via the storage appliance, both the command set and a communications channel between the storage appliance and the data storage device are changed. The command set is changed by re-obfuscation or re-encoding by a different method or in a different form, and the communications channel is changed by being reconfigured to a new channel by any suitable method known and described in the art.

In step 140, an interface library of the storage appliance is statically linked to an authorized application on the host computer. Only the authorized application, and not the operating system or other software applications on the host computer, may access the data storage device through the storage appliance.

Some current security methods, characterized by the "security through obscurity" philosophy, may rely on "covert but static" obfuscation similar to that undertaken in step 120. However, if the command set is not re-obfuscated often, a determined attacker may, over time, by monitoring the interface, infer the meanings of the obfuscated commands. The continual reconfiguration of the communications channel in the present invention requires the attacker to decode the command set in this way quickly and continuously, greatly increasing the difficulty of the attack. Changing the command set itself also requires any attacker to defeat dynamic variations in not one but two dimensions of the attack surface.

Step 130 can take any of several forms and may be accomplished by any of several mechanisms, but most commonly, an algorithm implementing the process will, after each command sent to the data storage device via the storage appliance, randomly change the logical unit number (LUN) assigned to the data storage device by a direct-attached storage (DAS) protocol, such as a small computer system interface (SCSI) protocol, or a similar protocol of a storage area network (SAN), such as a Fibre Channel or internet SCSI (iSCSI) protocol. Because only the storage appliance and the host computer are aware of the algorithm used to randomize the LUN, any attacker attempting to gain unauthorized access to a volume of the data storage device will almost certainly be attempting to read and/or write to a LUN that, at the time of the attempted attack, has no associated data storage device. This "LUN hopping" technique thus provides a layer of security in much the same way as "IP hopping" in software-defined networks.

Figure 2:
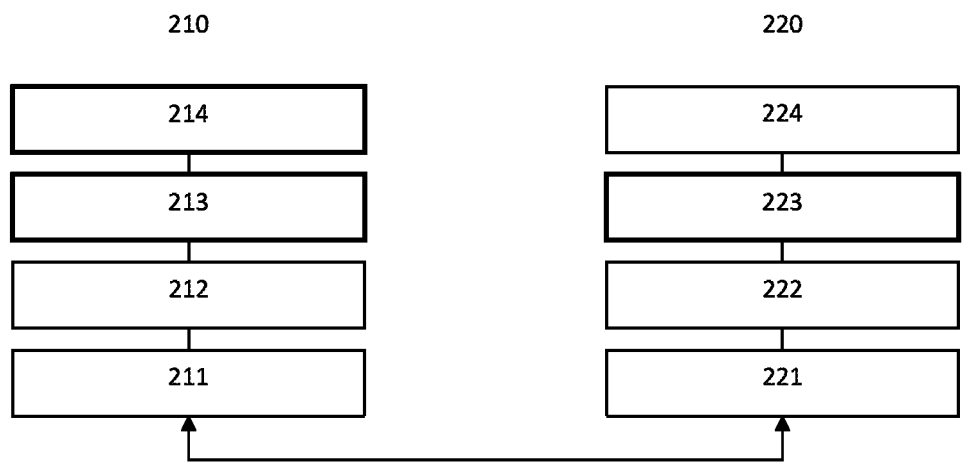
FIG. 2 is a schematic diagram illustrating a data storage system implementing a moving target defense, according to embodiments of the present invention.

Referring now to FIG. 2, an exemplary moving target defense system 200 of the present invention is illustrated. The system 200 illustrated in FIG. 2 is a DAS arrangement, in which a single data storage device 224 is directly attached to a single storage appliance 220, but those of ordinary skill in the art will understand and appreciate that other arrangements are possible, including but not limited to an SAN. Additionally, although the system 200 illustrated in FIG. 2 utilizes an iSCSI communication protocol, any suitable protocol may be used, and those of ordinary skill in the art will understand how to choose an appropriate protocol for a given application of the present invention.

The system 200 illustrated in FIG. 2 comprises a host computer 210 and a storage appliance 220. The host computer 210 comprises at least an SCSI initiator 211, an advanced SCSI programming interface (ASPI) 212, a moving target defense framework (MTDF) 213, and an authorized application 214. The storage appliance 220 comprises at least an SCSI target 221, a device plug-in module 222, MTDF extensions 223, and the data storage device 224. In operation, a user sends an SCSI command to the storage appliance 220 via SCSI initiator 211, seeking to read and/or write the data storage device 224. The ASPI 212 enables the MTDF 213 and authorized application 214 to communicate read and/or write commands to the data storage device 224. The device plug-in module 222 emulates the data storage device 224 and presents this emulation to the SCSI initiator 211. The MTDF 213 comprises a library that "sits atop" the ASPI 212. The authorized application 214 utilizes the library of the MTDF 213, and the MTDF extensions 223 mirror the library of the MTDF library 213.

The SCSI target 221, acting on algorithms embodied in the device plug-in module 222 and MTDF extensions 223, presents a plurality of LUNs to the SCSI initiator 211. Only one of the LUNs presented to the SCSI initiator 221 is the "correct" or "active" LUN of the data storage device 224; the remainder are "dummy" LUNs presented to obfuscate any attack. Because the ASPI 212, MTDF 213, authorized application 214, device plug-in module 222, and MTDF extensions 223 are based on a common library, the "correct" LUN will be known to the host computer 210; any other computer that is not equipped with ASPI 212 and MTDF 213 will not be able to determine the correct LUN and so will attempt to read or write to a non-existent storage device associated with one of the dummy LUNs.

Once the SCSI session terminates, the device plug-in module 222 and MTDF extensions 223 randomly change the LUN assigned to the data storage device 224 by the SCSI target 221. Again, because the algorithm used to change the LUN is known to software running on both the host computer 210 and storage appliance 220, the user, by way of the SCSI initiator 211, will be able to initiate another SCSI session with the storage appliance 220 at a later time, but other computers that do not run ASPI 212 and MTDF 213 will be unable to ascertain how the LUN of the data storage device 224 will change. In this way, a secure "link" between host computer 210 and storage appliance 220 is established, but this link constantly shifts to prevent an unauthorized computer from gaining access to the data storage device 224.

Although the above discussion of embodiments of the invention has focused on the use of Fibre Channel or iSCSI protocols, those of ordinary skill in the art will understand that any suitable DAS or SAN protocol may be employed within the scope of the invention. By way of non-limiting example, ATA, SATA, eSATA, NVMe, NVMe-oF, SCSI, SAS, USB, USB 3.0, IEEE 1394, Fibre Channel, ATA over Ethernet (AoE), iSCSI, and HyperSCSI protocols may all be used.

One advantage of the present invention is that any attempt to gain access to the data storage device via an incorrect command set or communications channel is easily detected and logged. Preferably, after such an unauthorized attempt, the methods and systems of the present invention do not prevent further attempts to gain access, as doing so may enable the attacker to overwhelm the methods and systems with unauthorized attempts to orchestrate a denial-of-service (DoS) attack. In some embodiments, however, and particularly in those embodiments where other strategies are used to thwart DoS attacks, it may be desirable for the methods and systems of the present invention to prevent further attempts to access the data storage device.

Another advantage of the present invention is that it may be employed either instead of or in addition to other strategies for securing data storage devices. By way of non-limiting example, Challenge-Handshake Authentication Protocol (CHAP), Internet Protocol security (IPsec), and other similar features may be used in conjunction with the present invention.

The storage virtualization-based "moving target" defense methods and systems of the present invention may be implemented by policies and algorithms known only to the host computer and the storage appliance. These algorithms randomize the command sets and communications channels in ways that are unpredictable to would-be attackers; particularly, the random, dynamic, and/or continual modification of the command sets and communications channels reduces potential vulnerability exploits to DoS attacks.

Though the foregoing description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

The invention claimed is:

1. A moving target defense system for at least one data storage device, comprising:

the at least one data storage device;

a host computer, comprising a storage communications protocol initiator, an advanced storage programming interface (ASPI), a moving target defense framework (MTDF), and an authorized application, wherein the ASPI selectively enables the MTDF and the authorized application to send read and/or write commands to the at least one data storage device, wherein the MTDF comprises an MTDF library that is utilized by the authorized application; and a storage appliance, comprising a storage communications protocol target, a device plug-in module, and MTDF extensions, wherein the device plug-in module emulates the at least one data storage device and provides the emulation to the storage communications protocol initiator, wherein the MTDF extensions mirror the MTDF library, wherein, during a session initiated by a user of the host computer and based on at least one algorithm embodied in the MTDF library, the storage communications protocol target presents a plurality of logical unit numbers (LUNs) to the storage communications protocol initiator, wherein the plurality of LUNs comprises an active LUN assigned to the at least one storage device by a storage communications protocol and at least one dummy LUN, wherein the active LUN is known to the ASPI, the MTDF, and the authorized application, wherein, after the user-initiated session terminates and based on the at least one algorithm, at least one of the device plug-in module and MTDF extensions randomly changes the LUN assigned to the at least one data storage device by the storage communications protocol target.

2. The moving target defense system of claim 1, wherein the storage communications protocol is selected from the group consisting of ATA, SATA, eSATA, NVMe, NVMe-oF, SCSI, iSCSI, SAS, USB, USB 3.0, IEEE 1394, Fibre Channel, ATA over Ethernet (AoE), and HyperSCSI.

3. The moving target defense system of claim 1, wherein the at least one data storage device is interconnected to the storage appliance in a direct-attached storage (DAS) arrangement.

4. The moving target defense system of claim 3, wherein the storage communications protocol is an SCSI protocol.

5. The moving target defense system of claim 1, wherein the at least one data storage device is interconnected to the storage appliance in a storage area network (SAN) arrangement.

6. The moving target defense system of claim 5, wherein the storage communications protocol is selected from the group consisting of a Fibre Channel protocol and an iSCSI protocol.

7. The moving target defense system of claim 1, wherein at least one of the device plug-in module and the MTDF extensions is configured to detect and log at least one attempt to access the at least one data storage device via a dummy LUN.

8. The moving target defense system of claim 7, wherein, after the at least one attempt, the device plug-in module and the MTDF extensions allow further commands to be sent to the at least one data storage device from the host computer via the storage appliance.

9. The moving target defense system of claim 7, wherein, after the at least one attempt, the device plug-in module and the MTDF extensions prevent further commands from being sent to the at least one data storage device from the host computer via the storage appliance.

10. The moving target defense system of claim 1, wherein the system implements at least one additional data storage security technique.

11. The moving target defense system of claim 10, wherein the at least one additional data storage security technique is selected from the group consisting of CHAP and IPsec.

* * * * *